United States Patent
Zhou

(10) Patent No.: US 8,010,554 B1
(45) Date of Patent: Aug. 30, 2011

(54) PROCESSING A TEMPORAL AGGREGATE QUERY IN A DATABASE SYSTEM

(75) Inventor: Xin Zhou, Los Angeles, CA (US)

(73) Assignee: Teradata US, Inc., Dayton, OH (US)

( * ) Notice: Subject to any disclaimer, the term of this patent is extended or adjusted under 35 U.S.C. 154(b) by 528 days.

(21) Appl. No.: 11/983,348

(22) Filed: Nov. 8, 2007

(51) Int. Cl.
*G06F 17/20* (2006.01)
*G06F 15/16* (2006.01)

(52) U.S. Cl. ......................... 707/769; 709/203

(58) Field of Classification Search .................. 707/769; 709/203, 217, 218
See application file for complete search history.

(56) References Cited

U.S. PATENT DOCUMENTS
2006/0288045 A1* 12/2006 Raz ............................... 707/200

OTHER PUBLICATIONS

Zhou et al; Efficient Coalescing Query Support in Relational Database Systems; Sep. 21, 2006; pp. 676-686.*
SpringerLink; Proof of date for "Efficient Coalescing Query Support in Relational Database Systems;" pp. 1-2.*
Wang et al; Bridging Relational Database History and the Web: the XML Approach; Nov. 10, 2006; pp. 3-10.*
D. Lomet et al., "Immortal DB: Transaction Time Support for SQL Server," SIGMOD 2005, Baltimore, MD, pp. 939-941 (Jun. 14-16, 2005).
Oracle Technology Network, "Oracle Database 11g—Oracle Flashback Technology," http://www.oracle.com/technology/deploy/availability/htdocs/Flashback_Overview.htm, 8 pages (at least as early as Sep. 14, 2007).
G. Özsoyoğlu et al., "Temporal and Real-Time Databases: A Survey," pp. 1-51 (1995).

* cited by examiner

*Primary Examiner* — Shahid A Alam
*Assistant Examiner* — Alex Gofman
(74) *Attorney, Agent, or Firm* — Trop, Pruner & Hu P.C.

(57) ABSTRACT

A query is received to perform a temporal aggregate on at least one attribute of a temporal table. In response to the query, value changes of the at least one attribute at timestamps are computed, and the value changes are aggregated to produce an aggregate value for the query.

12 Claims, 3 Drawing Sheets

PROCESSING A TEMPORAL AGGREGATE QUERY IN A DATABASE SYSTEM

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

Certain tables contain temporal data, where rows (or tuples) of the table contain timestamp information to indicate a time associated with each row. In one example, a new row can be inserted into a temporal table whenever some information associated with a particular record changes. Each new row inserted into the table is associated with a timestamp to indicate the time of change, for example.

One type of query that can be performed with respect to tables in a database is an aggregate query, which performs aggregation (e.g., sum, average, etc.) of attribute values in the table. However, if the table is a temporal table containing rows associated with timestamps, then performing a simple aggregation on attribute values may not produce accurate results. Conventionally, when performing aggregation on a temporal table, relatively complex nested queries are submitted to perform aggregation properly. Such nested queries are complex and prone to error.

SUMMARY

In general, according to an embodiment, in response to receiving a query to aggregate at least one attribute of a temporal table, plural timestamps in the temporal table are identified. Value changes in the at least one attribute are computed at the plural timestamps, and the value changes are aggregated to produce an aggregate value for the query.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
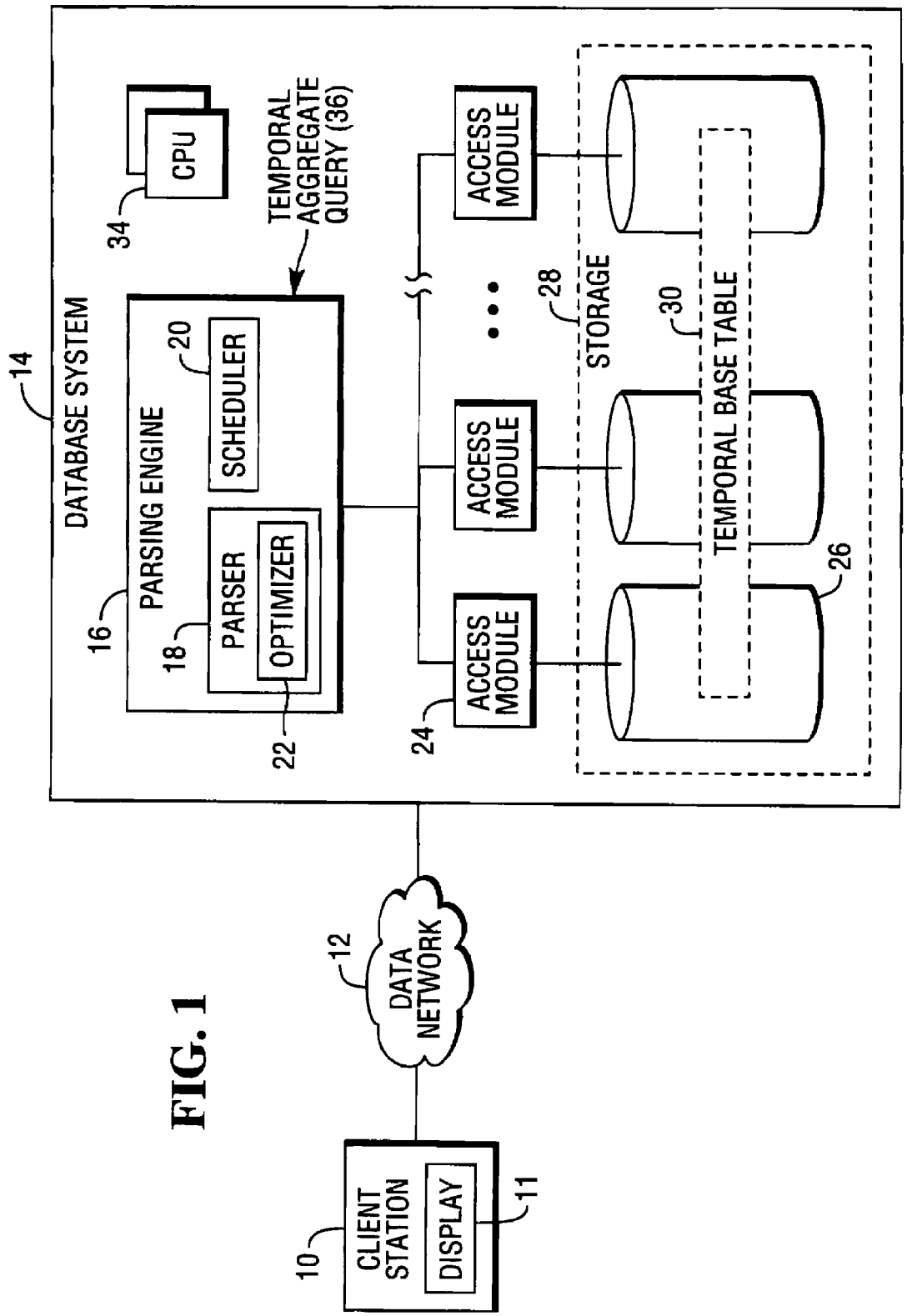
FIG. 1 is a block diagram of an example arrangement that includes a database system according to an embodiment.

FIG. 1 illustrates an example arrangement in which a client station (or plural client stations) 10 is (are) coupled to a database system 14 over a data network 12. Examples of the data network 12 include a local area network (LAN), a wide area network (WAN), the Internet, and so forth. The client station 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI).

The database system 14 includes a storage subsystem 28 that stores various data, including relational tables. Each relational table contains rows and columns. The storage subsystem 28 includes plural storage modules 26, which can be physical storage devices or logical representations of partitions of the storage subsystem 28.

The database system 14 also includes a parsing engine 16, which has a parser 18 and a scheduler 20. The parser 18 receives database queries (such as those submitted by the client system 10), parses the received query, and generates executable steps. The parser 18 includes an optimizer 22 that generates query plans, selecting the most efficient from among the plural query plans. The scheduler 20 sends the executable steps generated by the parser 18 to multiple access modules 24 in the database system.

Each access module 24 performs the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from Teradata Corporation (formerly a division of NCR Corporation). Each access module 24 manages access of data in respective storage modules 26. The presence of multiple access modules 24 and corresponding storage modules 26 define a parallel database system. In alternative embodiments, instead of database systems having multiple access modules, a database system with only one access module can be employed.

The access modules 24 and parsing engine 16 are part of the database software executable in the database system 14. The database software is executable on one or more central processing units (CPUs) 34 of the database system 14. In the example of FIG. 1, the components of the database system 14 are depicted as being part of one node. Note that the database system 14 can actually be implemented in a multi-node system where each node contains one or more access modules 24 and parsing engines 16 to provide a distributed database architecture.

As further depicted in FIG. 1, a temporal base table 30 can be stored in the storage subsystem 28. The temporal base table 30 can be distributed across multiple storage modules 26, where different portions of the temporal base table 30 are stored in different storage modules 26.

A temporal base table 30 refers to a table that has rows (or tuples) containing timestamp information. The timestamp information indicates a time associated with the record represented by the tuple. The timestamp can indicate a time at which some event occurred, such as a change event (some attribute of a record has changed), and so forth. Alternatively, the timestamp information can indicate a time window or period during which the corresponding data in the row is applicable or valid. To specify the time window or period, the timestamp information can include a starting timestamp and an ending timestamp.

As depicted in FIG. 1, a query that can be received by the parsing engine 16 of the database system 14 is a temporal aggregate query 36 to perform temporal aggregation of at least one attribute of the temporal base table 30. "Temporal aggregation" of an attribute refers to computing an aggregate (e.g., sum, average, minimum, maximum, median, etc.) of values of the attribute contained in rows that have a time dimension (specified by the timestamp information). Since the rows have a time dimension, there may be multiple rows, for a given entity, that assign different values at different times to the attribute that is being aggregated. To produce an accurate result, performing aggregation in this context should take into account the assignment of different values at different times.

In some embodiments, the temporal aggregate query can be processed in linear time corresponding to the size of the base table 30. A further benefit provided by some embodiments is that simple Structured Query Language (SQL) queries can be used to perform the temporal aggregation. For example, the SQL queries can be SQL on-line analytic processing (OLAP) queries, such as those defined by SQL99, which is an ANSI (American National Standards Institute) standard. In other implementations, other types of SQL queries can be used to perform the temporal aggregation. An example SQL OLAP query includes a query that specifies an aggregate function (e.g., a moving window aggregate function).

A temporal aggregate query differs from traditional aggregate queries, in that temporal aggregate queries have to take the time dimension into consideration when performing aggregation on one or more attributes. One example is discussed in the context of an example base table, named EMPLOYEE_HISTORY, which contains temporal records.

| EMPNO | SALARY | TITLE | TSTART | TEND |
|---|---|---|---|---|
| 1001 | $60,000 | Software engineer | Jan. 1, 2005 | Dec. 31, 2005 |
| 1002 | $62,500 | Software engineer | Jan. 1, 2005 | Feb. 28, 2006 |
| 0801 | $80,000 | Sr. Software engineer | Jan. 1, 2005 | Mar. 31, 2006 |
| 0501 | $100,000 | Manager | Jan. 1, 2005 | Apr. 30, 2006 |
| 1001 | $62,500 | Software engineer | Jan. 1, 2006 | Now |
| 1002 | $72,500 | Software engineer | Mar. 1, 2006 | Now |
| 0801 | $90,000 | Sr. Software engineer | Apr. 1, 2006 | Now |
| 0501 | $110,000 | Manager | May 1, 2006 | Now |

The attributes (columns) of the EMPLOYEE_HISTORY table include employee number (EMPNO), salary (SALARY), title (TITLE), a starting timestamp (TSTART), and an ending timestamp (TEND). In the example above, two tuples (or rows) are present for each employee. For example, the first row and the fifth row are for the employee having EMPNO 1001, the second and sixth rows are rows for EMPNO 1002, and so forth. The difference between the rows for the same employee is that the two different rows contain different timestamp information. Thus, the first row for EMPNO 1001 has a starting timestamp of 01-01-2005, and ending timestamp of 12-31-2005. In the example above, during this time period (from the starting timestamp to the ending timestamp), the employee had a salary of $60,000. Later, in a subsequent time period, 01-01-2006 and continuing to the present, the same employee (EMPNO 1001) has an increased salary of $62,500 (as indicated by the fifth row in the example EMPLOYEE_HISTORY table above).

Similar timestamp information and associated different salary values for other employees are listed in the example EMPLOYEE_HISTORY table above.

Suppose an organization is interested in a query (Q1) that seeks the total salary paid for all employees in the organiza tion in 2005 and 2006 (combined). A traditional aggregate query such as:

Select Sum(Salary) from Employee_History;

would simply sum all of the SALARY values in the rows of the above example table (in other words, a sum of SALARY in all eight rows of the example table). This sum will return $637,500, which would be the wrong answer, since the total salary paid to all employees in 2005 and 2006 combined would be much less then $637,500. The correct response to the query is summarized in the summary table below:

| SALARY_SUM | TSTART | TEND |
|---|---|---|
| $302,500 | Jan. 1, 2005 | Dec. 31, 2005 |
| $305,000 (=$302,500 + $2,500) | Jan. 1, 2006 | Feb. 28, 2006 |
| $315,000 (=$305,000 + $10,000) | Mar. 1, 2006 | Mar. 31, 2006 |
| $325,000 (=$315,000 + $10,000) | Apr. 1, 2006 | Apr. 30, 2006 |
| $335,000 (=$325,000 + $10,000) | May 1, 2006 | Now |

In the example summary table above, SALARY_SUM represents the aggregate that is being sought by the example query Q1. In the time period starting at 01-01-2005 and ending at 12-31-2005, SALARY_SUM is $302,500. This represents the combined annual salary of all four employees (1001, 1002, 0801, 0501) in the period between 01-01-2005 and 12-31-2005. Starting at 01-01-2006, however, employee 1001 received a raise from $60,000 to $62,500 (which represents a raise of $2,500). Thus, in the second row of the summary table above, SALARY_SUM becomes $305,000 (=$302,500+$2,500), which takes into account the change in salary in the time period between 01-01-2006 and 02-28-2006. Starting on 03-01-2006, employee 1002 received a raise from $62,500 to $72,500 (a raise of $10,000). Thus, in the third row of the summary table above, SALARY_SUM becomes $315,000 (=$305,000+$10,000), which takes into account the change in salary in the period between 03-01-2006 and 03-31-2006. Starting on 04-01-2006, employee 0801 received a raise from $80,000 to $90,000 (a raise of $10,000). Thus, SALARY_SUM in the fourth row of the summary table is increased to $325,000, which takes into account the change in salary in the period between 04-01-2006 and 04-30-2006. Finally, on 05-01-2006, employee 0501 received a raise of $10,000, which causes SALARY_SUM in the fifth row of the summary table to be increased to $335,000. The $335,000 number is the final aggregate value for the query Q1, which sought the total salary paid to all employees in 2005 and 2006 combined.

In accordance with some embodiments, a temporal aggregate SQL query can be used to efficiently perform temporal aggregation. The temporal aggregate query is relatively simple and can use existing SQL queries, such as SQL OLAP queries. Generally, the temporal aggregate query is processed by identifying plural timestamps in a temporal table, and computing value changes of the attribute that is to be aggregated at the plural timestamps. The value changes are then aggregated to produce an aggregate value that represents the result for the query.

The above general tasks for performing the temporal aggregation are described in the context of an example given in FIGS. 2(a)-2(d). Four tuples 102, 104, 106, and 108 are graphically represented in FIG. 2(a). Tuple 102 contains the SALARY attribute value (100K) for employee 2. The timestamp information associated with tuple 102 includes beginning timestamp t2 and ending timestamp t3. The second tuple 104 contains the SALARY attribute value (80K) for employee 1, with starting timestamp t1 and ending timestamp t3. Tuple 106 contains the SALARY attribute value (70K) for employee 2 for the time period starting at timestamp t0 and ending at timestamp t2. Tuple 108 contains the SALARY attribute value (60K) for employee 1 in the time period starting at timestamp t0 and ending at timestamp t1.

Figure 2:
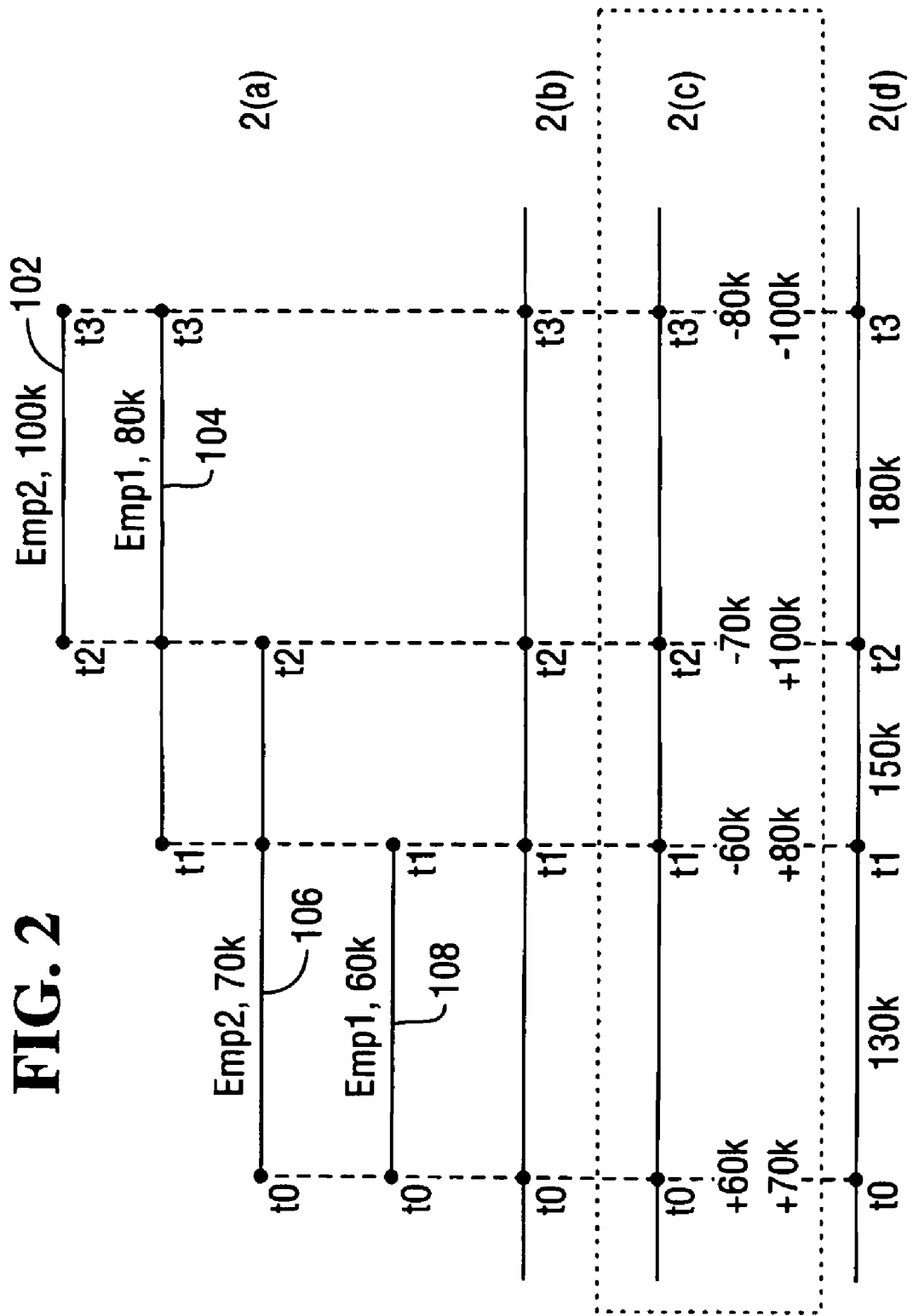
FIG. 2 is a graph that illustrates several example tuples and a technique of aggregating an attribute of the tuples, in accordance with an embodiment.

In FIG. 2(b), the algorithm for performing the temporal aggregation identifies the timestamps represented by the four tuples 102, 104, 106, 108. In this example, the identified timestamps include t0, t1, t2, and t3. Note that the identified timestamps are distinct timestamps.

For each of the identified timestamps, attribute value changes (or deltas) are determined, as depicted in FIG. 2(c). For example, at timestamp t0, the value change of the SALARY attribute for employee 1 is +60K, and the value change for the SALARY attribute for employee 2 is +70K. The +60K value change for employee 1 at timestamp t0 is based on tuple 108, and the +70K value change for employee 2 at timestamp t0 is based on tuple 106.

In general, at any given timestamp, if the timestamp corresponds to the starting timestamp (TSTART) of a tuple, then the attribute value (in this case the SALARY attribute value) of the tuple is indicated as a positive change. On the other hand, if the timestamp corresponds to the ending timestamp (TEND) of a tuple, then the attribute value of the tuple is indicated as a negative change. Timestamp t0 corresponds to the starting timestamp for both tuples 106 and 108, so that the SALARY values of tuples 106 and 108 are both positive additions (change values) at timestamp t0.

On the other hand, timestamp t1 is the ending timestamp for tuple 108, but is the starting timestamp for tuple 104. As a result, at timestamp t1, the SALARY attribute value of tuple 108 is indicated as a negative change (−60K), but the SALARY value of tuple 104 is indicated as a positive change (+80K).

Timestamp t2 is the ending timestamp for tuple 106, and the starting timestamp for tuple 102. As a result, at timestamp t2, the SALARY value of tuple 106 is indicated as a negative change (−70K), but the SALARY value of tuple 102 is indicated as a positive change (+100K).

Timestamp t3 is the ending timestamp for both tuples 102 and 104, such that the SALARY values of both tuples 102 and 104 are subtracted (−80K, −100K) at timestamp t3.

Once the values changes are determined at the timestamps according to the algorithm above, as depicted in FIG. 2(c), the total salary is equal to the sum of value changes at the different timestamps prior to timestamp t3 (which is the overall ending timestamp). Thus, the total salary is equal to (+60K+70K)+(−60K+80K)+(−70K+100K)=(180K). The sums are illustrated in FIG. 2(d). Thus, after the sum of value changes at timestamp t0, the output is 130K. Adding the value changes at timestamp t1, the total salary becomes 150K. After adding the value changes at timestamp t2, the total salary becomes 180K. The total salary 180K is the output for the temporal aggregate query (which sought the total salary for the period between t0 and t3). At time stamp t3, the total salary sum gets back down to zero in the above example.

To analyze the computational time cost for the algorithm depicted in FIGS. 2(b)-2(d), note that FIG. 2(c) involves the projection of a salary change at each time point, which involves a single scan of the input tuples. The task of FIG. 2(d) is a simple SQL aggregate (SUM) query that can sequentially scan the value changes and produce a sum aggregate in different time windows corresponding to the timestamps t0, t1, t2, and t3. The sum aggregate in the different time windows can use a moving window aggregate function. The scanning takes linear time so that the total time cost is on the order of n, which is the number of input tuples.

An example temporal aggregate query is depicted in the context of the example below, where the query is performed on an EMPLOYEE_HISTORY table created as follows:

CREATE table EMPLOYEE_HISTORY (EMPNO int, SALARY int, TSTART int, TEND int);
INSERT INTO EMPLOYEE_HISTORY values (1, 50000, 0, 3);
INSERT INTO EMPLOYEE_HISTORY values (2, 50000, 0, 2);
INSERT INTO EMPLOYEE_HISTORY values (2, 60000, 2, 4);
INSERT INTO EMPLOYEE_HISTORY values (1, 65000, 3, 5);
INSERT INTO EMPLOYEE_HISTORY values (2, 70000, 4, 6);
INSERT INTO EMPLOYEE_HISTORY values (1, 85000, 5, 6);

The above INSERT statements are used to insert corresponding rows into the EMPLOYEE_HISTORY table. The following is one example temporal aggregate SQL query statement to perform temporal aggregation on the SALARY attribute values of the rows above:

WITH T1 (ts, DeltaSalary) AS (
SELECT TSTART, SALARY
FROM EMPLOYEE_HISTORY
UNION ALL
SELECT TEND, 0-SALARY
FROM EMPLOYEE_HISTORY
),
/*on each timestamp, get the total delta salary*/
WITH T2 (ts, SALARY) AS (
SELECT ts, SUM(DeltaSalary)
FROM T1
GROUP BY ts
)
/*final output, calculate the sum delta salary on the cumulative window*/
SELECT SUM(SALARY) over (order by ts rows between unbounded preceding and 1 preceding) as TotalSalary,
sum(ts) over (order by ts rows between 1 preceding and 1 preceding) as TSTART,
ts as TEND
FROM T2

In the example SQL statement above, tables T1 and T2 are temporary spool tables. The temporary spool table T1 is used to store two rows for each input row (EMPNO, SALARY, TSTART, TEND). The two rows created in T1 for a given input tuple include (TSTART, SALARY) and (TEND, −SALARY).

The temporary spool table T2 is used to store the value changes of the SALARY attribute at each timestamp (based on the GROUP BY on ts, which corresponds to TSTART and TEND in spool table T1).

The SELECT clause of the example aggregate SQL query above performs a sum over the value changes (represented as DeltaSalary in spool table T2).

Figure 3:
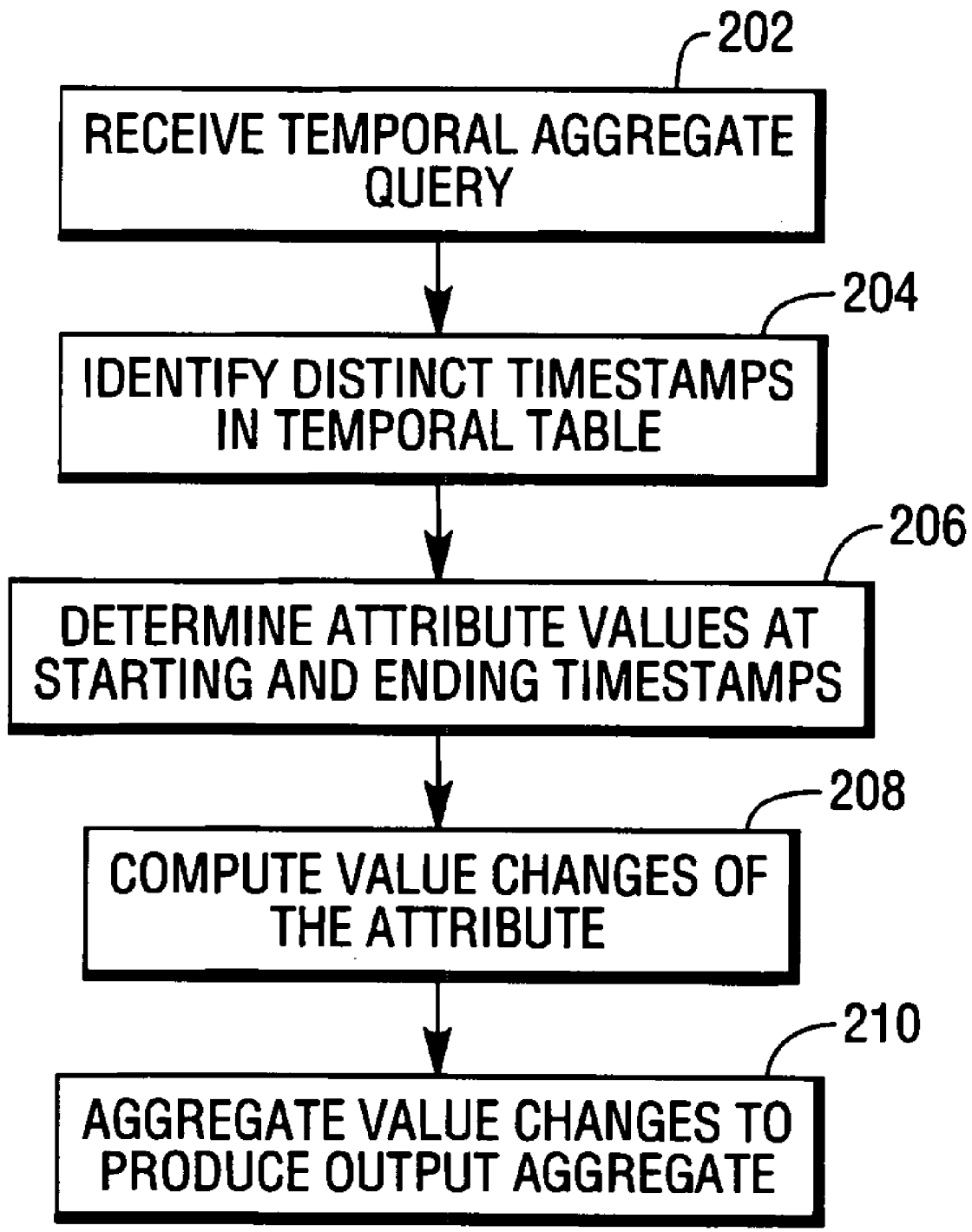
FIG. 3 illustrates a method of processing a temporal aggregate query, in accordance with an embodiment.

FIG. 3 shows a process according to an embodiment. A temporal aggregate query is received (at 202) by the database software. In response, the database software identifies (at 204) distinct timestamps in the temporal table. Attribute values at starting and ending timestamps are determined (at 206), which can be stored in a first spool table, such as in the spool table T1 discussed above. Next, value changes at the identified timestamps are computed (at 208). The value changes can be stored in a second spool table (e.g., T2 above). Note that in other implementations, storing of values in spool tables can be avoided. Next, the values are aggregated (at 210) to produce the output aggregate for the temporal aggregate query.

Instructions of the various software routines or modules discussed herein (such as the database software) are loaded for execution on corresponding processors (such as CPUs 34 in FIG. 1). The processors include microprocessors, microcontrollers, processor modules or subsystems (including one or more microprocessors or microcontrollers), or other control or computing devices. As used here, a "processor" can refer to a single component or to plural components.

Data and instructions (of the various software modules and layers) are stored in one or more storage devices, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by at least one processor in a database system comprising:
   receiving, by the at least one processor, a query to aggregate at least one attribute of a temporal table, wherein the temporal table includes plural tuples, wherein each tuple contains the at least one attribute and distinct timestamps including starting and ending timestamps, wherein the at least one attribute is different from the starting timestamp and ending timestamp; and
   in response to the query, the at least one processor:
      computing value changes in the at least one attribute at the distinct timestamps, wherein computing the value changes comprises:
         at each given one of the distinct timestamps, determining whether the given timestamp corresponds to a starting timestamp or an ending timestamp of a particular one of the tuples;
         if the given timestamp is the starting timestamp, providing a positive value change corresponding to the value of the at least one attribute in the particular tuple; and
         if the given timestamp is an ending timestamp, providing a negative value change corresponding to the value of the at least one attribute in the particular tuple; and
      aggregating the value changes to produce an aggregate value for the query, wherein the aggregate value is the aggregate of the positive and negative values associated with the at least one attribute.

2. The method of claim 1, wherein receiving the query comprises receiving a Structured Query Language (SQL) query.

3. The method of claim 1, wherein receiving the query comprises receiving a Structured Query Language (SQL) on-line analytic processing (OLAP) query.

4. The method of claim 1, wherein aggregating the value changes to produce the aggregate value comprises summing the value changes.

5. The method of claim 1, further comprising:
   creating a first temporary spool table containing a pair of rows for each of the tuples, where the pair of rows for each given tuple comprises a first row containing the starting timestamp and the corresponding value of the at least one attribute of the given tuple, and a second row containing the ending timestamp and a negative of the value of the at least one attribute of the given tuple.

6. The method of claim 5, further comprising creating a second temporary spool table to store the value changes, wherein computing the value changes is based on the first temporary spool table.

7. The method of claim 6, wherein aggregating the value changes comprises aggregating the value changes in the second temporary spool table.

8. The method of claim 1, wherein receiving the query comprises receiving a single query, and wherein the identifying, computing, and aggregating are performed in response to the single query.

9. An article comprising at least one computer-readable storage medium containing instructions that when executed cause at least one processor in a database system to:
   receive a query to aggregate at least one attribute of a set of input tuples, each of the tuples containing distinct timestamps including a starting timestamp and an ending timestamp, wherein the at least one attribute in each of the tuples is different from the distinct timestamps in the corresponding tuple;
   in response to the query,
      determine value changes of the at least one attribute corresponding to the distinct timestamps, comprising:
         at each given one of the distinct timestamps, determining whether the given timestamp corresponds to a starting timestamp or an ending timestamp of a particular one of the tuples;
         if the given timestamp is the starting timestamp, providing a positive value change corresponding to the value of the at least one attribute in the particular tuple; and
         if the given timestamp is an ending timestamp, providing a negative value change corresponding to the value of the at least one attribute in the particular tuple; and
      aggregate the determined value changes to produce an aggregate value for the query, wherein the aggregate value is the aggregate of the positive and negative values associated with the at least one attribute.

10. The article of claim 9, wherein receiving the query comprises receiving a single query, wherein the determining and aggregating are performed in response to the single query.

11. A database system comprising:
   a storage subsystem to store a temporal base table having a plurality of tuples each containing distinct timestamps and at least one attribute different from the distinct timestamps; and
   at least one processor to:
      determine values changes of the at least one attribute corresponding to the distinct timestamps, wherein determining the value changes of the at least one attribute comprises at each given one of the distinct timestamps, subtracting the value of the at least one attribute of the corresponding tuple that ends at the given timestamp, and adding the value of the at least one attribute of the corresponding tuple that starts at the given timestamp, and aggregate the determined value changes to produce an aggregate value for a temporal aggregate query.

12. The database system of claim 11, wherein the temporal aggregate query comprises a Structured Query Language (SQL) on-line analytic processing (OLAP) query.

* * * * *